United States Patent [19]

Stenzel et al.

[11] Patent Number: 4,797,897
[45] Date of Patent: Jan. 10, 1989

[54] APPARATUS FOR CONTROLLING THE DISTANCE OF A MELTING ELECTRODE FROM THE SURFACE OF THE MELTED MATERIAL IN A VACUUM ARC FURNACE

[75] Inventors: Otto Stenzel, Gründau; Friedrich-Werner Thomas, Gelnhausen, both of Fed. Rep. of Germany

[73] Assignee: Leybold Aktiengesellschaft, Hanau, Fed. Rep. of Germany

[21] Appl. No.: 110,721

[22] PCT Filed: Nov. 29, 1986

[86] PCT No.: PCT/DE87/00487
§ 371 Date: Aug. 10, 1987
§ 102(e) Date: Aug. 10, 1987

[87] PCT Pub. No.: WO87/03772
PCT Pub. Date: Jun. 18, 1987

[30] Foreign Application Priority Data
Dec. 13, 1985 [DE] Fed. Rep. of Germany ....... 3544005

[51] Int. Cl.⁴ .......................................... H05B 7/148
[52] U.S. Cl. .................................................. 373/105
[58] Field of Search .................. 373/70, 67, 102, 104, 373/105

[56] References Cited

U.S. PATENT DOCUMENTS

| | | |
|---|---|---|
| 2,915,572 | 12/1959 | Buehl . |
| 2,942,045 | 6/1960 | Johnson . |
| 3,143,587 | 8/1964 | Buehl . |
| 3,372,224 | 3/1968 | Jackson et al. ........................ 373/70 |
| 3,385,920 | 5/1968 | Harbaugh et al. .................... 373/70 |
| 3,872,231 | 3/1975 | Motter et al. . |
| 4,303,797 | 12/1981 | Roberts . |
| 4,578,795 | 3/1986 | Fisher et al. . |

FOREIGN PATENT DOCUMENTS

| | | |
|---|---|---|
| 1169604 | 5/1964 | Fed. Rep. of Germany . |
| 1212651 | 3/1966 | Fed. Rep. of Germany . |
| 1815359 | 7/1970 | Fed. Rep. of Germany . |
| 3000996 | 2/1981 | Fed. Rep. of Germany . |
| 3020336 | 2/1982 | Fed. Rep. of Germany . |

Primary Examiner—Roy N. Envall, Jr.
Attorney, Agent, or Firm—Felfe & Lynch

[57] ABSTRACT

Apparatus for controlling the distance of a melting electrode from the surface of melted material in a vacuum arc furnace which uses short circuits caused by the droplets between the melting electrode and the surface of the melted material as a control criterion. The short circuits occurring within a given period of time—the so-called droplet rate—are determined and supplied to an averager which is connected with a controller that controls an electric driving mechanism for the melting electrode. According to the invention, the controller is responsive to a signal representing the difference between the reciprocal value of the droplet rate signal formed by the averager and a desired time, this desired time being equal to the desired average time between two consecutive droplet short circuits.

11 Claims, 3 Drawing Sheets

APPARATUS FOR CONTROLLING THE DISTANCE OF A MELTING ELECTRODE FROM THE SURFACE OF THE MELTED MATERIAL IN A VACUUM ARC FURNACE

The invention relates to apparatus for controlling the distance of a melting electrode from the surface of the melted material in a vacuum arc furnace.

BACKGROUND OF THE INVENTION

For producing high-grade metals and metal alloys, which have the least possible inclusions of foreign objects and are homogeneous in structure, various methods are known. One of the best-known methods is electric-arc melting, in which an electrode extends towards a crucible and, by applying an electric potential between the electrode and the crucible, the tip of the electrode melts away and falls as a liquid material into the crucible. As a rule, the so-called melting electrode is connected to one pole of a direct-current voltage and the crucible to the other pole of this direct-current voltage. However, superpositions of alternating-current voltages are also possible to achieve particular effects.

A major problem in operating arc melting furnaces of the above-mentioned type lies in the control of the arc length, that is, of the distance between the lower end of the electrode and the surface of the melted material that is already in the crucible. If the arc is too long, the electrode and/or the melted material could be heated wrongly, so that the quality of the melted material is greatly reduced. Since, on the one hand, the level of the melted material in the crucible is constantly rising and, on the other, the distance between the end of the electrode and the surface of the crucible cannot be observed directly, special measures must be taken to control this distance.

In arc furnaces which operate at or only slightly below atmospheric pressure, the arc length is controlled by maintaining a given arc voltage. At atmospheric pressure, the plasma is characterized by the fact that it has a particular voltage gradient, for example, 20 volts per 2.5 cm. The voltage drops at the cathode and anode surfaces together amount to an additional 20 volts, so that, if an arc length of, for example, 1.25 cm is to be maintained, the electrodes will then have to be brought into such a position that the arc voltage is 30 V. This can be realized by means of conventional equipment which measures and controls the arc voltage.

In arc melting furnaces which operate under vacuum, the above-described method can, however, not always be employed. Such arc melting furnaces are used especially for melting so-called refractory active metals, such as titanium or zirconium, as well as for preparing stainless steels and high-temperature alloys. When the gas pressure, which surrounds the arc, decreases, the voltage gradient of the arc plasma also decreases and, at very low pressures, the voltage gradient of the arc plasma may, for example, by only one volt per 2.5 cm. Since the anode and cathode voltage drops for steel, for example, are approximately 20 volts, the voltage drop at the arc is very small in comparison with the remaining voltage drops. Changes in the gas content and the alloy composition affect the anode and cathode voltage drops in the order of magnitude of the voltage drop in the "arc column". Consequently, the method of controlling the arc by keeping the arc voltage constant is not very effective, especially in the case of steels, since the actual length of the arc will usually deviate greatly from the desired length.

An arc melting furnace has meanwhile become known which, for controlling the distance between the electrode and the surface of the melted material, makes use of the knowledge that, even in normal operation, the voltage breaks down briefly at certain time intervals (U.S. Pat. No. 2,942,045). This effect is caused by short-circuits, which originate from liquid metal droplets, which drop from the electrode into the crucible and briefly connect the electrode electrically with the melted material in the crucible. As long as the duration and frequency of these short-circuits are not very large, the arc operates almost at full power, so that there is no substantial effect on the heating of the melted material. If the arc becomes shorter, the frequency of the arc short-circuits increases.

In accordance with the known arc melting furnace, the distance between the electrodes is controlled by maintaining the frequency of the arc short-circuits within a particular range. For example, a voltmeter is observed and the time intervals between the individual droplets are measured with a stopwatch, so that the droplets per unit time can be determined.

Other known equipment for controlling the distance between the electrodes in an arc melting furnace is premised on the knowledge that voltage fluctuations in the form of positively increasing pulses, each of which occurs for a short period of, for example, 40 milliseconds with a frequency of 30 Hz, are superimposed on the arc voltage (German Pat. No. 1,212,651). These voltage pulses, the cause of which need not be discussed herein, are used to control the electrode distance by dividing the voltage curve into a basic component and a second component. The pulse-shaped fluctuations, which occur in the second component as voltage, current or impedance fluctuations, are detected and the distance between the electrodes is controlled as a function of the repetition frequency of these fluctuations. A pulse count of the overvoltages per unit time is thus carried out and, if the number of pulses is too low, the electrode is lowered.

With other known equipment for arc melting, the starting points are oscilloscopic or oscillographic observations which show that brief short-circuits of 0.1 to 0.3 seconds occur between the electrode and the molten metal surface of the crucible during the melting of metals in vacuum. In addition, it is taken into consideration that changes occur in the arc voltage which arise from impurities which, in turn, are based on changes in the composition or in the pressure of the inert gas atmosphere or are caused by a deflection of an arc from the electrode to the crucible wall, these last-mentioned voltage changes being less than the voltage changes which occur when droplets of molten metal connect the electrode with the molten metal bath (U.S. Pat. No. 2,915,572). This known arrangement includes equipment with which the electrode is moved in the direction of the surface of the metal in the crucible by an amount which is at least equal to the difference between the melting rate and the rate at which the metal surface rises. The arrangement furthermore has equipment which, on the basis of the molten droplets between the electrode and the metal surface, is activated in a specified position of the electrode in relation to the surface of the metal in order to move the electrode a certain distance away from the metal surface. The voltage short-circuits are detected here by a relay, which controls a timer.

Furthermore, an arrangement for controlling the distance between electrodes is known in which the droplet short-circuits between the electrode and the liquid metal surface of the crucible are used as a control criterion (U.S. Pat. No. 4,578,795). The droplet short-circuits and the corresponding voltage reductions appear here as iterative pulses, which are closely correlated with the distance between the electrodes. The number of droplet short-circuits is summed and, every time that the number of short-circuits has reached a specified value, the average period between the short-circuits, as well as the time required to reach this value, are calculated and stored. A microprocessor is used to make these calculations and to display the duration of each short-circuit. Immediately after the pulse shaping of the natural droplet short-circuits, the system operates digitally. The normalized pulses are supplied to an event counter. The pulse quantity is previously entered manually and can be changed from case to case. If the contents of the event counter fall below the pulse count that has been set, as can be determined by coincidence, a command is given to the timer, and the time that has elapsed between the respective coincidences is read. This value serves as a measure of the distance between the electrode and the liquid metal surface. The reading is renewed whenever the given number of droplet short-circuits is reached (e.g., approximately 100 short-circuits).

An arrangement of this type has two disadvantages; namely, that the reading is renewed only after relatively long intervals of time and thus is not current, and that when there are few or even no drops, the time that elapses before a control intervention becomes very long. On the other hand, if the droplet count is high, the control intervention is very rapid. The droplet count determination times represent a dead time. This dead time is differently long for different operating conditions. The time response of the metering element is nonlinear. The phase rotation of the signal thus depends on the momentary operating state. The magnitude of the control intervention, when there is a deviation from the desired value, must be severely limited to avoid oscillations. The circuit amplification must thus be small. This brings about a sluggish control of "disturbance variables" with large deviations from the desired value.

Finally, yet another method and an associated arrangement are known for controlling the electrode drive velocity in an arc furnace. In this case the time between two consecutive droplet short-circuits is measured and the average time between a specified number of previous short-circuits is calculated (U.S. Pat. No. 4,303,797). For example, the time interval between the ten last short-circuits is calculated and supplied as an actual value to a controller. The transitional behavior of this equipment in the event of signal changes is less than advantageous.

SUMMARY OF THE INVENTION

It is therefore an object of the present invention to provide equipment with which it is possible to achieve an improved control of the electrodes in a vacuum arc furnace.

This as well as other objects are achieved by means of a controller which is acted upon by a signal that corresponds to the difference between the reciprocal value of the droplet rate signal formed by the averager and a desired value, which is equal to the desired average time between two consecutive droplet short-circuits.

The advantage achieved with the invention thus consists especially in that it is possible not only to adjust the electrode controller very exactly, but also to achieve a very rapid control with only slight deviations from the desired value. The invention in this way optimizes the closed control circuit which, when compared to an open control circuit, has the disadvantage that there must be a control deviation before the controller can make a correction of all of a manipulated variables. In general control technology, an attempt is made to eliminate this disadvantage by means of a control with so-called "disturbance variable" compensation.

In the present case, a disturbance variable is measured and supplied over an auxiliary controller to the correcting element. When a disturbance variable appears, a correcting signal is produced immediately without first having to wait for a control deviation. Viewed from the disturbance variable, this branch represents an open chain; that is, an open control with all its disadvantages.

As used herein, the term "droplet rate" to be understood to mean the number of short-circuits within a certain period of time, whereas the "droplet cycle" is the time between two droplet short-circuits. Although the droplet rate and the droplet cycle are reciprocal values of one another, it is not unimportant in the present case whether the average value is formed first, and then the reciprocal value, or the reverse, because the averaging is an addition process, while the formation of a reciprocal value is a multiplication process. Consequently, the arithymetic mean of a sum of times is not equal to the reciprocal of an arithmetic mean of a sum of rates; that is, of the sum of the reciprocal of the times. This difference affects the control since the transient response during signal changes—that is, the so-called "transient behavior"—is decisively improved in the solution pursuant to the invention. The dead time in the apparatus of the invention is always of the same length.

An example of the operation of the invention is shown in the drawings and described in greater detail in the following.

DESCRIPTION OF THE PREFERRED EMBODIMENTS

Figure 1:
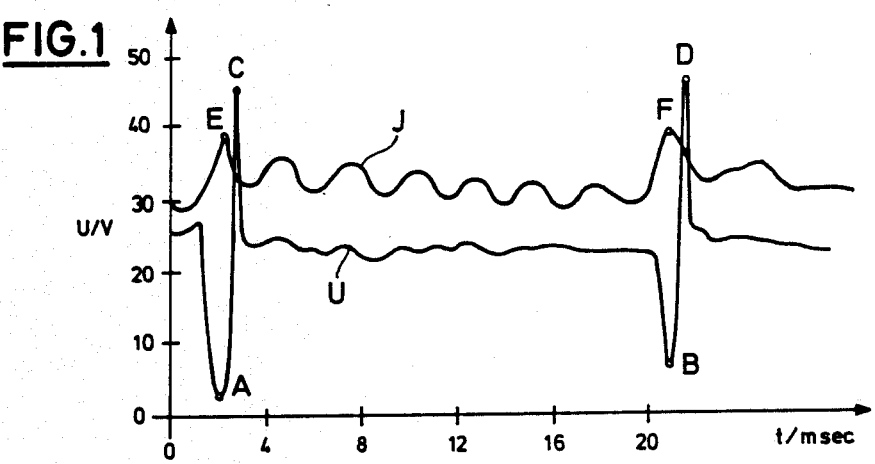
FIG. 1 shows the voltage and current curves for a typical droplet short-circuit.

FIG. 1 shows how the voltage, which is applied to a melting electrode and a crucibee, as well as the current, which flows through this path, vary with time. It can be seen here that for a direct current, superimposed by an alternating current with a slight amplitude, the voltage U generally remains constant and has a minimum only at the points A,B and a maximum at the points C,D. When the voltage U has a minimum, the current J has a maximum, as at the points E and F.

The minima at points A and B in each case indicate a short-circuit which is caused by a droplet of liquid metal that briefly connects the electrode with the surface of the molten metal in the crucible.

Figure 2:
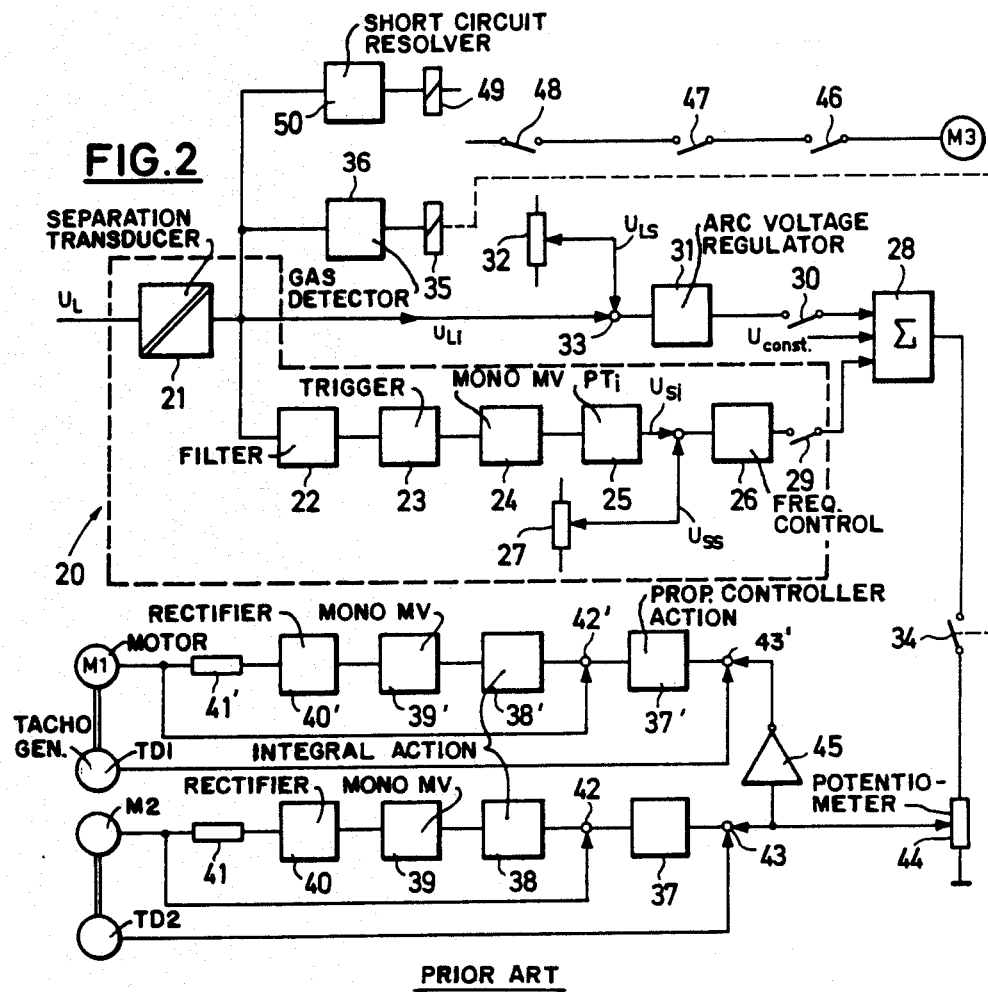
FIG. 2 shows a known control circuit for the advance of an electrode into a melting crucible.

FIG. 2 shows a known circuit arrangement, which is suitable for the droplet short-circuit control. The differences and advantages of the invention can be made more distinct by reference to this known circuit arrangement. The actual droplet short-circuit control (=drop short control) is identified here by the reference number 20. It contains several components and operates as follows. After the galvanic separation of the arc voltage $U_L$ by a separation transducer 21, the minima due to the droplet short-circuits are filtered out over a differential element 22. The threshold frequency of the differential element 22 is so designed, that the short-circuits can be detected without error. The filtered pulses are formed in a subsequent trigger circuit 23 and, in a subsequent monostable multivibrator 24, they are converted into standard pulses; that is, into pulses of constant amplitude and width.

An integrator, more precisely a $PT_1$ element 25 with a fixed integration time, forms the average pulse value from the normalized pulses obtained. The output signal of this integrator 25 represents the actual short-circuit frequency value $U_{si}$, which is compared with a desired short-circuit frequency $U_{ss}$ established by a potentiometer 27 and supplied as a difference to the short-circuit frequency controller 26.

The corresponding digital procedure for this system would be the counting of pulses by a digital counter with a fixed time base and the evaluation of the pulse count obtained within a fixed time interval. The number of droplet short-circuits obtained within a fixed time would thus be counted. As an averager, a ring counter could be used, which determines the average value over all the short-circuits detected within the ring time.

The remaining parts of the circuit of FIG. 2 have nothing to do with the actual short-circuit frequency control, although they are required for the overall control. They take into account other variables that influence the control, because the droplet short-circuits are only one of several possible control criteria, as is expressed by the summation element 28. Aside from a constant voltage $U_{const}$, the output signal of the short-circuit frequency controller 26 may, for example, be connected via a switch 29. Moreover, the summation element 28 may additionally be acted upon via a switch 30 by the output signal of a general arc voltage controller 31. The difference between the actual arc voltage $U_{Li}$ and a desired arc voltage $U_{LS}$, which is obtained from a potentiometer 32, is supplied through a coupling element 33 to this arc voltage regulator 31. The output signal of this summation element 28 is connected via a controllable switch 34 with the motor regulators. The switch 34 may be controlled here by a relay 35, which is triggered by a voltage produced by a gas detector 36. The motor regulators referred to control two motors M 1 and M 2, which are provided for the differential drive of the electrode. These motor regulators are of the same type and in each case have a proportional action controller 37 and 37', respectively; an integral action controller 38 and 38', respectively, a monostable multivibrator 39, 39'; a rectifier 40, 40', respectively; and a resistance 41 and 41', the monostable multivibrator output of the resistance being returned to a coupling element 42, 42', which lies between the proportional action controller 37, 37' and the integral action controller 38, 38'. Moreover, the output signal of a tacho-alternator $TD_1$, $TD_2$ is returned to a coupling element 43, 43', respectively. The coupling element 43 is connected between the tap of a potentiometer 44 and the proportional action controller 37, while the coupling element 43' is connected between the output of a phase-inverter amplifier 45, which also lies at the tap of the potentiometer 44, and the proportional action controller 37'. A further motor M 3 of the differential gearing of the electrode can be connected over switches 46, 47, 48, switch 48 being controlled by a relay 49, which, in turn, is triggered by a short-circuit resolver circuit 50.

Figure 3:
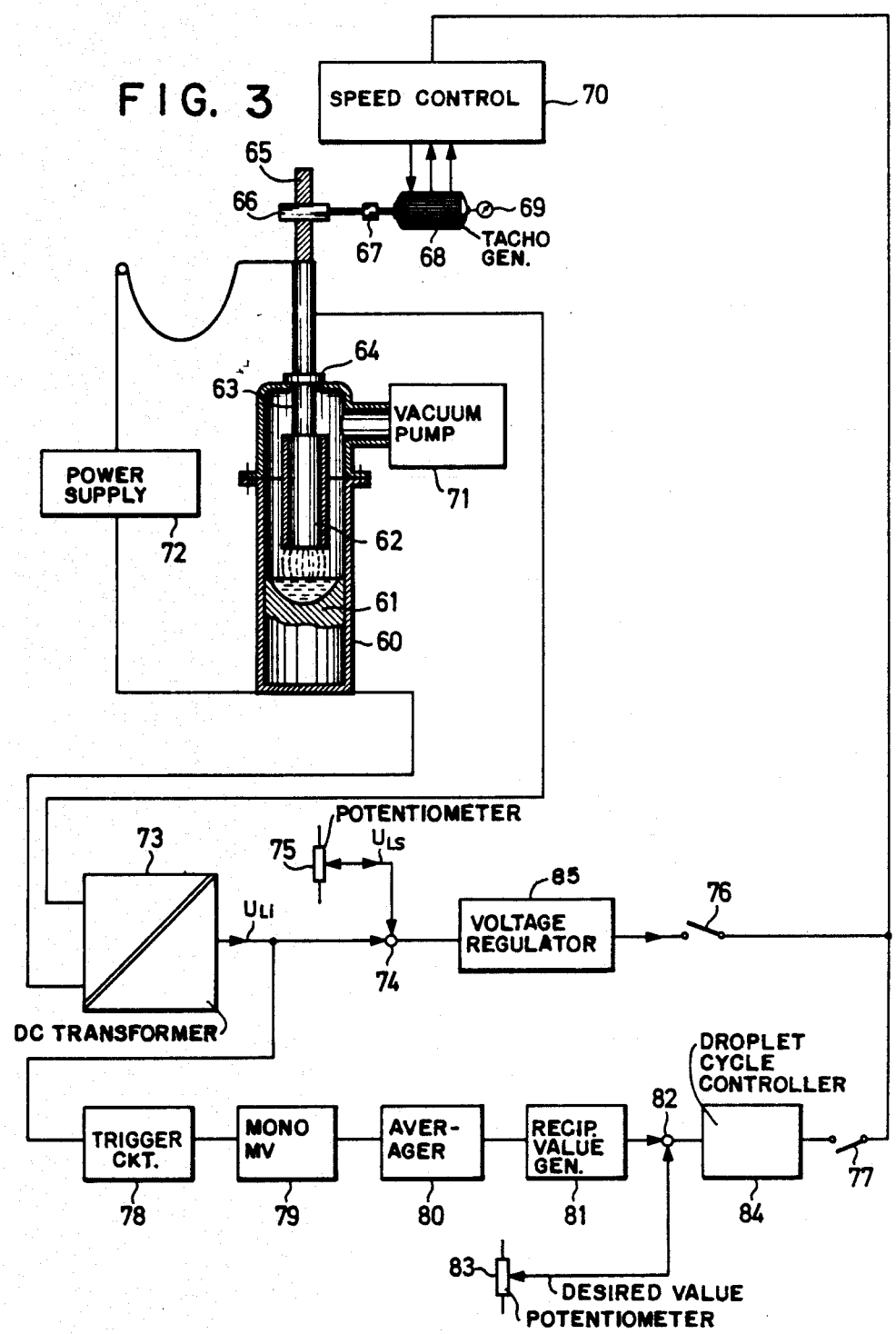
FIG. 3 shows an inventive circuit arrangement for the droplet short-circuit control in a melting electrode connection using analog circuitry.

FIG. 3 shows an inventive circuit arrangement which in some details corresponds to the arrangement of FIG. 2. The actual droplet control, however, now takes place in a different manner. For the purpose of illustration, the circuit arrangement as well as the melting crucible 60 are shown, in which there is the molten material 61, for example, the molten metal or a molten alloy. Above this molten material 61 is disposed a melting electrode 62 which is attached to a holding rod 63 that protrudes through an opening into the melting crucible and is secured there by means of flange 64. The part of the holding rod 63 that protrudes out of the crucible 60 is provided with a thread 65, which is passed through a driving nut 66. This driving nut 66 is connected with a set of speed reduction gears 67 that, in turn, is coupled to a motor 68, which also drives a tachometer generator 69. A speed control device 70 acts on the motor 68 and is, in turn, acted upon by signals from the tachometer generator 69. At the melting crucible 60, there is a vacuum pump system 71, which keeps the interior of the melting crucible 60 at a specified low pressure. Between the base of the melting crucible 60 and the holding rod 63 of the electrode 62, there is connected a power supply 72 which applies a voltage—the so-called arc voltage—between the end of the electrode and the surface of the melted material 61. The actual value of the arc voltage is given by a direct current transformer 73, the output signal $U_{Li}$ of which is supplied to a coupling element 74, that also receives the desired arc value $U_{LS}$, which is supplied by a potentiometer 75.

The difference between the actual and the desired value of the arc voltage is supplied to a voltage regulator 85, which gives a control signal to the speed control 70 via a switch 76. The actual droplet cycle control 84 is connected via a different switch 77 to the speed control 70. It contains a trigger circuit 78, which is connected with the direct current transformer 73 and triggers the droplet short-circuit pulses coming from there. The pulses, emitted by the trigger circuit 78 may still differ in amplitude and/or pulse width and are therefore supplied to the pulse normalizer 79, which forms from them pulses of a uniform size and shape. The only essential characteristic of the pulses coming from the pulse normalizer is thus the time interval between them; that is, the pulse cycle. In a downstream averager 80, the average value of all pulses within a given time interval is then formed. An important feature of the present invention is the provision of a reciprocal-value generator 81 which forms the reciprocal value from the output signal of the averager 80. If the averager 80 has, for example, detected X droplet short-circuits within a period of T seconds, the pulse rate for this period is X/T. In the reciprocal value generator 81, this value is inverted; that is, 1/X is calculated per period T. This reciprocal value is then supplied as the actual value to a coupling element 82, to which is also supplied a desired value selected by a potentiometer 83. The difference between the actual and the desired value is passed to a droplet cycle controller 84, which is connected via the already mentioned switch 77 with the speed control 70.

Figure 5A:
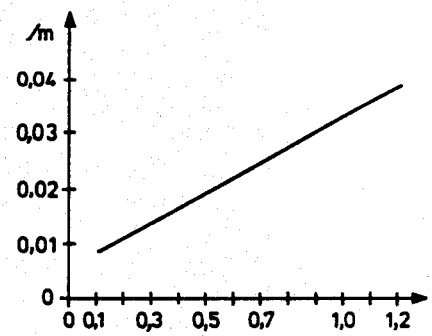
FIG. 5a shows a graphic representation that demonstrates the functional relationship between gap width and droplet cycle.
Figure 5B:
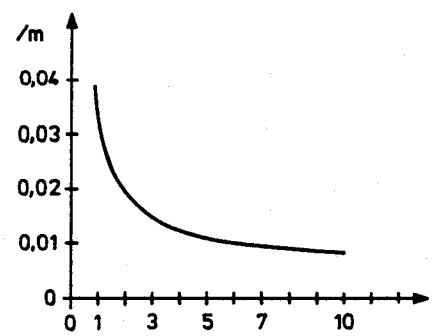
FIG. 5b shows a graphic representation that demonstrates the functional relationship between gap width and droplet frequency.

As shown by a comparison of FIGS. 2 and 3, a nonlinear circuit amplification results with the arrangement of FIG. 2. Measurements (see, for example, the measurement curves of U.S. Pat. No. 4,578,795 mentioned above) show that the average droplet frequency—that is, the interval between two drops—is an approximately linear function of the arc length. Since the reciprocal value of the droplet rate is the droplet cycle, the droplet rate thus has a hyperbolic relationship with the arc length (see FIG. 5b). If a controller is now employed which uses the droplet frequency (rate) as the controlling frequency, as shown in FIG. 2, and the distance is included, there results a control circuit with a nonlinear circuit amplification. To avoid oscillations, the magnitude of the control intervention in the event of a deviation from the desired value must be greatly limited. The circuit amplification must therefore be chosen to be small. This means a sluggish control of disturbance variables with large deviations from the desired value.

If, on the other hand, as with the arrangement of FIG. 3, the reciprocal of the output signal of the averager 80 is generated, the deviation signal is proportional to the distance deviation. The time constant and the circuit amplification are constant, so that the controller can be adjusted optimally.

Figure 4:
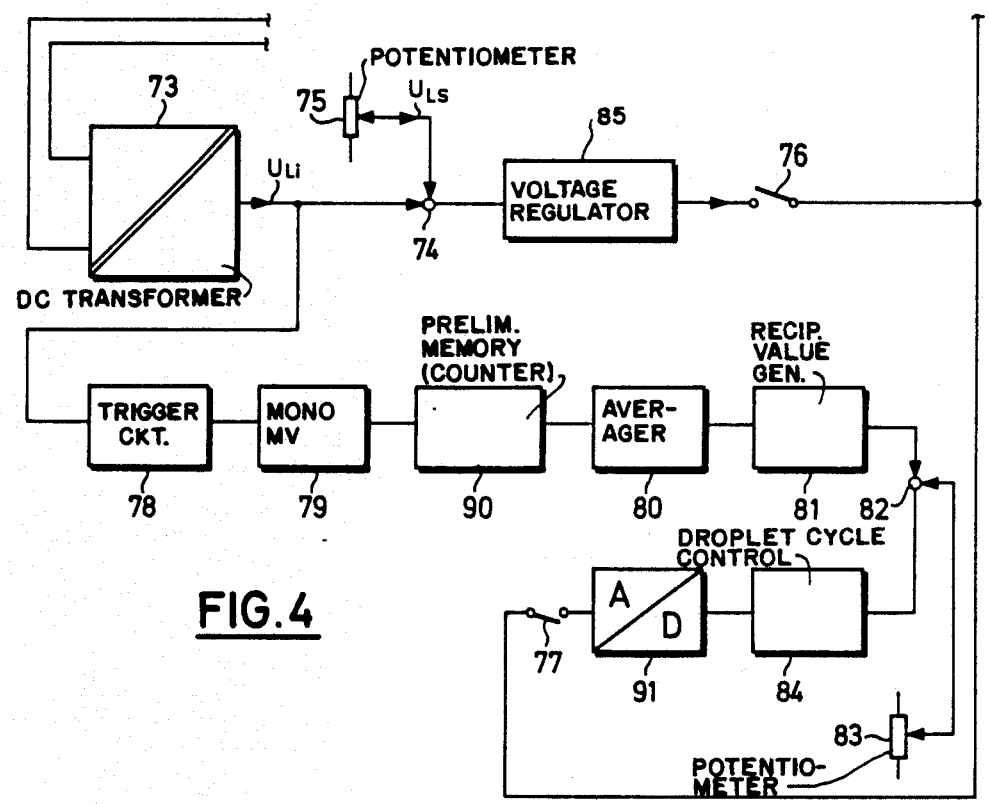
FIG. 4 shows an inventive circuit arrangement corresponding to FIG. 3, however using digital circuitry.

A digital version of the arrangement of FIG. 3 is shown in FIG. 4, the upper region being omitted. It can be seen here that only a preliminary memory 90 has been connected between the pulse normalizer 79 and the averager 80 and a digital-analog converter 91 has been connected to the output of the droplet cycle regulator 84. The preliminary memory 90 sums all pulses which accumulate during a cycle time of the digital evaluation device. The content of its memory is read by the averager 80 at the respective end of the cycle time.

There has thus been shown and described a novel apparaltus for controlling the distance of a melting electrode from the surface of the melted material in a vacuum arc furnace which fulfills all the objects and advantages sought therefor. Many changes, modifications, variations and other uses and applications of the subject invention will, however, become apparent to those skilled in the art after considering this specification and the accompanying drawings which disclose the preferred embodiements thereof. All such changes, modifications, variations and other uses and applicaitons which do not depart from the spirit and scope of the invention are deemed to be covered by the invention which is limited only by the claims which follow.

We claim:

1. In apparatus for controlling the arc distance between a melting elctrode and the surface of melted material in a vacuum arc furnace, wherein the short-circuits caused by the droplets between the melting electrode and the surface of the melted material are used as a control criterion, said apparatus comprising means for determining the short-circuits occurring within a given period of time, the so-called droplet rate; an averager (80), coupled to said short circuit determining means, for averaging of said droplet rate; and controller means, coupled to said averager, for controlling said arc distance in dependence upon the average droplets rate; the improvement comprising reciprocal value forming means (81), coupled to said averager (80), for producing a signal representing the reciprocal value of the droplet rate signal produced by said averager; desired value forming means for producing a signal representative of the desired average time between to consecutive droplet short circuits; and means coupled to said reciprocal value forming means and to said desired value forming means, for producing a signal representative of the difference between said reciprocal value and said desired value, said controller means being responsive to said difference signal.

2. Apparatus as defined in claim 1, further comprising a trigger circuit (78) that detects the droplet short-circuits and pulse normalizing means (79), responsive to said trigger ciruict, connected ahead of said averager (80).

3. Apparatus as defined in claim 1, wherein said controller means (84) is connected through a switch (77) with a speed controller (70) and this speed cotroller (70) is connected through a further switch (76) with a voltage regulator (75) for the arc voltage applied across said melting electrode and said melted material.

4. Apparatus as defined in claim 3, wherein the speed controller (70) controls a motor (68), which drives a gear-reduction set (67) that is connected with a holding device (63) of the melting electrode (62).

5. Apparatus as defined in claim 2, wherein said pulse normalizing means is a monostable multivibrator (39,39').

6. Apparatus as defined in claim 1, wherein said averager is a $PT_1$ element.

7. Apparatus as defined in claim 1, further coprising a ring counter, which determines the average value over all short-circuits detected in the ring time.

8. Apparatus as defined in claim 1, wherein said averager (80), said reciprocal value forming means (81), said desired value forming means (83) and said controller means (84) are digital elements and said apparatus further comprises a digital-analog converter coupled to said controller means for converting the output signals thereof into an analog signal for controlling said arc distance.

9. Apparatus as defined in claim 1, wherein the signal processing is carried out in a hybrid circuit; that is, in a partially digital, partially analog circuit.

10. Apparatus as defined in claim 8, further comprising a preliminary memory (90), arranged ahead of said averager (80), said preliminary memory summing all pulses of said short circuit determining means during the cycle time, the content of said memory being supplied to said averager (80) at the respective end of the cycle time.

11. In apparatus for controlling the arc distance between a melting electrode and the surface of melted material in a vacuum arc furnace, wherein the short-circuits caused by the droplets between the melting electrode and the surface of the melted material are used as a control criterion, said apparatus comprising means for determining the short-circuits occurring within a given period of time, the so-called droplet rate; an averager (80), coupled to said short circuit determining means, for averaging said droplet rate; and controller means, coupled to said averager, for controlling said arc distance in dependence upon the average droplet rate, the method comprising the steps of:

determining the reciprocal of the average droplet rate formed by said averager;
determining the desired average time between two consecutive droplet short circuits; and determining the difference between said reciprocal value and said desired value;
wherein said controller means is made responsive to said difference for controlling said arc distance.

* * * * *